(12) United States Patent
Moran

(10) Patent No.: US 11,474,923 B2
(45) Date of Patent: Oct. 18, 2022

(54) METHOD FOR NOTIFYING USER OF OPERATIONAL STATE OF WEB APPLICATION

(71) Applicant: JPMorgan Chase Bank, N.A., New York, NY (US)

(72) Inventor: Jack Stephen Moran, Falkirk (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/276,095

(22) Filed: Feb. 14, 2019

(65) Prior Publication Data

US 2020/0267232 A1 Aug. 20, 2020

(51) Int. Cl.
| | | |
|---|---|---|
| G06F 11/32 | (2006.01) | |
| H04L 67/02 | (2022.01) | |
| G06F 11/30 | (2006.01) | |
| H04L 67/025 | (2022.01) | |
| H04L 67/10 | (2022.01) | |
| G06F 3/0481 | (2022.01) | |
| G06F 3/04812 | (2022.01) | |
| G06F 3/04817 | (2022.01) | |

(52) U.S. Cl.
CPC .......... *G06F 11/324* (2013.01); *G06F 11/302* (2013.01); *G06F 11/3055* (2013.01); *G06F 11/327* (2013.01); *H04L 67/02* (2013.01); *H04L 67/025* (2013.01); *G06F 3/0481* (2013.01); *G06F 3/04812* (2013.01); *G06F 3/04817* (2013.01); *G06F 11/328* (2013.01); *H04L 67/10* (2013.01)

(58) Field of Classification Search
CPC .... G06F 3/048; G06F 3/0481; G06F 3/04812; G06F 3/04817; G06F 11/30; G06F 11/3003; G06F 11/3006; G06F 11/302; G06F 11/3055; G06F 11/32; G06F 11/324; G06F 11/327; G06F 11/328; G06F 2201/865; H04L 67/02; H04L 67/025; H04L 67/10; H04L 67/01
See application file for complete search history.

(56) References Cited

U.S. PATENT DOCUMENTS

| | | | | |
|---|---|---|---|---|
| 8,797,330 B1 * | 8/2014 | Haase | ................... | G06F 3/0481 345/473 |
| 2008/0046100 A1 * | 2/2008 | Balasubramanian | ........................ | G06F 11/327 700/17 |

(Continued)

OTHER PUBLICATIONS

R. Khatipov, A. Negimatzhanov, I. Zamaleev, A. Zakirov, M. Mazzara and V. Rivera, "Hikester—The Event Management Application," 2018 32nd International Conference on Advanced Information Networking and Applications Workshops (WAINA), Krakow, 2018, pp. 462-468 (Year: 2018).*

(Continued)

*Primary Examiner* — Hermon Asres
*Assistant Examiner* — William C McBeth
(74) *Attorney, Agent, or Firm* — Greenblum & Bernstein, P.L.C.

(57) ABSTRACT

Various methods, apparatuses, and media for notifying a user of an operational state of a web application are provided. Three values that relate to data caching, error occurrence, and data retrieval are used to determine the operational state. The methods may use a software module that is compatible with any React JavaScript application.

15 Claims, 6 Drawing Sheets

(56) References Cited

U.S. PATENT DOCUMENTS

| | | | | |
|---|---|---|---|---|
| 2009/0150820 A1* | 6/2009 | Hayman | ............... | G06F 3/0481 |
| | | | | 715/772 |
| 2010/0313159 A1* | 12/2010 | Decker | ................ | G06F 3/0481 |
| | | | | 715/772 |
| 2013/0042196 A1* | 2/2013 | Yamanaka | ........... | G06F 3/0484 |
| | | | | 715/772 |
| 2013/0103757 A1* | 4/2013 | Mitchell | ................ | H04L 67/01 |
| | | | | 709/204 |
| 2014/0184471 A1* | 7/2014 | Martynov | ............ | G06F 3/0481 |
| | | | | 345/1.2 |
| 2015/0195340 A1* | 7/2015 | Tulchinsky | ............ | H04L 67/02 |
| | | | | 709/203 |
| 2016/0180567 A1* | 6/2016 | Lee | ....................... | G06F 3/0481 |
| | | | | 345/473 |
| 2016/0357577 A1* | 12/2016 | Gao | ...................... | G06F 3/0481 |
| 2017/0300211 A1* | 10/2017 | Wang | ................. | G06F 3/04817 |
| 2019/0004929 A1* | 1/2019 | Fastabend | ........... | G06F 11/3055 |
| 2019/0069124 A1* | 2/2019 | Labrecque | ............ | G06F 3/0481 |
| 2020/0084225 A1* | 3/2020 | McKendall | ........... | H04L 63/145 |
| 2020/0174804 A1* | 6/2020 | Gupta | ..................... | G06F 9/451 |

OTHER PUBLICATIONS

Wikipedia contributors. "React (web framework)." Wikipedia, The Free Encyclopedia. Wikipedia, The Free Encyclopedia, Nov. 14, 2020. Web. Dec. 2, 2020. (Year: 2020).*

Wikipedia contributors. "Web framework." Wikipedia, The Free Encyclopedia. Wikipedia, The Free Encyclopedia, Apr. 15, 2021. Web. May 6, 2021. (Year: 2021).*

"Framework." TechTerms. TechTerms. Mar. 7, 2013. Web. May 6, 2021. (Year: 2013).*

Cary Wodehouse. "What is a Framework?" Upwork. Upwork. May 15, 2015. May 6, 2021. (Year: 2015).*

So, Preston. "React." Decoupled Drupal in Practice. Apress, Berkeley, CA, 2018. 313-334. (Year: 2018).*

* cited by examiner

METHOD FOR NOTIFYING USER OF OPERATIONAL STATE OF WEB APPLICATION

BACKGROUND

1. Field of the Disclosure

This technology generally relates to methods and apparatuses for monitoring web applications, and, more particularly, to methods and apparatuses for notifying a user of an operational state of a web application.

2. Background Information

When handling a network request from within a web application, there are standard event processing tasks that must be performed during the lifecycle of the network request. One such task entails determining whether a web application is in a data caching state, an error state, or a data retrieval state, and notifying a user of the operational state. Typically, a software engineer must generate application-specific code that handles this task.

However, for some web applications, such as web applications that are compatible with a React JavaScript library, it may be possible to determine an operational state by using modular software that is reusable for many other web applications. As a result, an unnecessary duplication of code may be avoided.

SUMMARY

The present disclosure, through one or more of its various aspects, embodiments, and/or specific features or sub-components, provides, inter alia, various systems, servers, devices, methods, media, programs, and platforms for notifying a user of an operational state of a web application. The various aspects, embodiments, features, and/or sub-components provide optimized processes of notifying a user of an operational state of a web application based on specific values that are obtainable from the web application during execution thereof According to an aspect of the present disclosure, a method for notifying a user of an operational state of a web application is provided. The method includes obtaining, from the web application, a first value that relates to a data caching state, a second value that relates to an error state, and a third value that relates to a data retrieval state; determining, based on the obtained first value, the obtained second value, and the obtained third value, the operational state of the web application; and displaying, on a screen of a user device, information that relates to the determined operational state.

The method may be implemented in a React JavaScript framework by using a set of computer-readable instructions that is compatible with any React JavaScript application.

The method may further include receiving, from the user, at least one instruction relating to a content of the information that relates to the determined operational state, and determining, based on the received at least one instruction, the content of the information to be displayed.

When the operational state of the web application is determined as a data caching state, the displaying may include displaying a rotating spinner icon.

When the operational state of the web application is determined as an error state, the displaying may include displaying a text string that indicates an occurrence of an error.

The web application may include at least one from among a Gmail application, a Dropbox application, and a Facebook application.

The method may further include updating the operational state by continuously obtaining, from the web application, each of the first value, the second value, and the third value, and when at least one from among the first value, the second value, and the third value has changed, determining an updated operational state and displaying updated information that relates to the determined updated operational state.

According to another aspect of the present disclosure, a computing apparatus that includes display, a processor, and a communication interface coupled to each of the processor and the display is provided. The processor is configured to obtain, from a web application that is running on the computing apparatus, a first value that relates to a data caching state, a second value that relates to an error state, and a third value that relates to a data retrieval state; determine, based on the obtained first value, the obtained second value, and the obtained third value, an operational state of the web application; and cause the display to display information that relates to the determined operational state.

The processor may be further configured to receive, from a user via the communication interface, at least one instruction relating to a content of the information that relates to the determined operational state, and to determine, based on the received at least one instruction, the content of the information to be displayed.

When the operational state of the web application is determined as a data caching state, the processor may be further configured to cause the display to display a rotating spinner icon.

When the operational state of the web application is determined as an error state, the processor may be further configured to cause the display to display a text string that indicates an occurrence of an error.

The web application may include at least one from among a Gmail application, a Dropbox application, and a Facebook application.

The processor may be further configured to update the operational state by continuously obtaining, from the web application, each of the first value, the second value, and the third value, and when at least one from among the first value, the second value, and the third value has changed, to determine an updated operational state and to cause the display to display updated information that relates to the determined updated operational state.

According to yet another aspect of the present disclosure, a non-transitory computer readable medium configured to store first instructions for implementing a method for notifying a user of an operational state of a web application is provided. When executed, the first instructions cause a computer to obtain, from the web application, a first value that relates to a data caching state, a second value that relates to an error state, and a third value that relates to a data retrieval state; determine, based on the obtained first value, the obtained second value, and the obtained third value, the operational state of the web application; and display, on a screen of a user device, information that relates to the determined operational state.

The method may be implemented in a React JavaScript framework, and wherein the first instructions are compatible with any React JavaScript application.

The first instructions may further cause the computer to receive, from the user, at least one second instruction relating to a content of the information that relates to the determined operational state, and to determine, based on the received at least one second instruction, the content of the information to be displayed.

When the operational state of the web application is determined as a data caching state, the first instructions may further cause the computer to display a rotating spinner icon.

When the operational state of the web application is determined as an error state, the first instructions may further cause the computer to a text string that indicates an occurrence of an error.

The web application may include at least one from among a Gmail application, a Dropbox application, and a Facebook application.

The first instructions may further cause the computer to update the operational state by continuously obtaining, from the web application, each of the first value, the second value, and the third value, and when at least one from among the first value, the second value, and the third value has changed, determining an updated operational state and displaying updated information that relates to the determined updated operational state.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
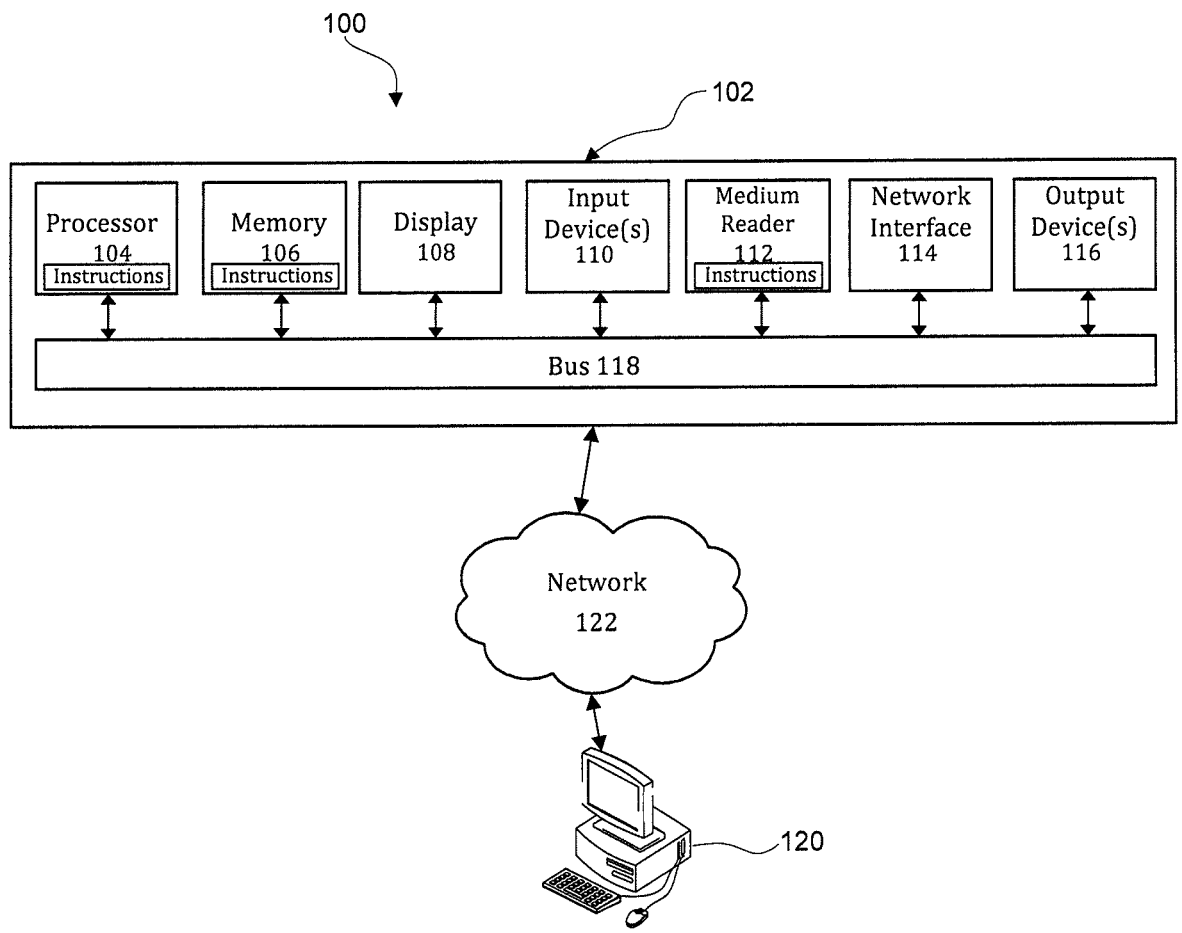
FIG. 1 illustrates an exemplary computer system for notifying a user of an operational state of a web application.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT). a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of notifying a user of an operational state of a web application.

Figure 2:
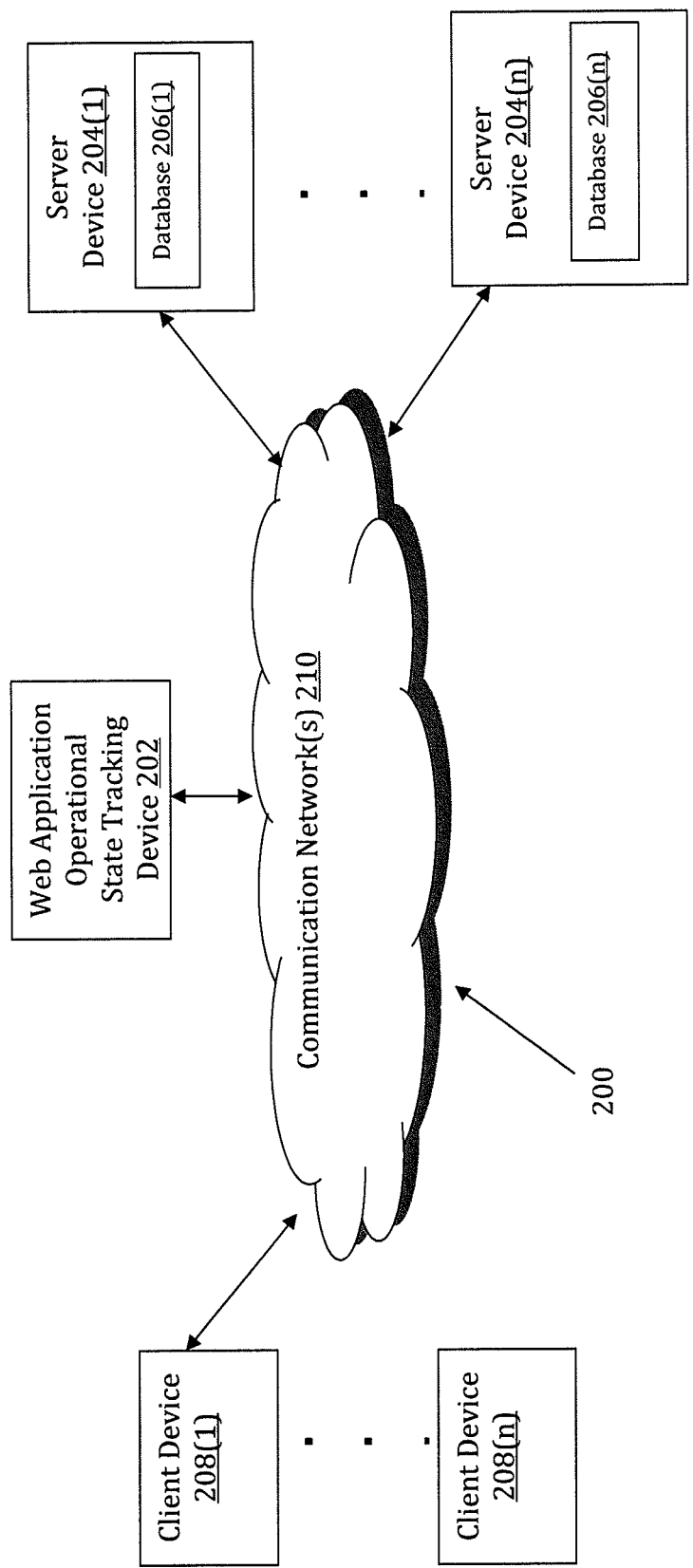
FIG. 2 illustrates an exemplary diagram of a network environment.

Referring to FIG. 2, a schematic of an exemplary network environment 200 for implementing a method for tracking an operational state of a web application and notifying a user of the operational state is illustrated. In an exemplary embodiment, the method is implemented in a React JavaScript framework by using a customized React component that is compatible with any React JavaScript application. The web application may include any web application that is usable in a React JavaScript framework, such as, for example, a Gmail application, a Dropbox application, and/or a Facebook application. In an exemplary embodiment, the web application is a single page web application.

The tracking of the operational state of the web application may be report production may be implemented by a Web Application Operational State Tracking (WAOST) device 202. The WAOST device 202 may be the same or similar to the computer system 102 as described with respect to FIG. 1. The WAOST device 202 may store one or more applications that can include executable instructions that, when executed by the WAOST device 202, cause the WAOST device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the WAOST device 202 itself, may be located in virtual server(s) running in a cloud-based computing environment rather than being tied to one or more specific physical network computing devices. Also, the application(s) may be running in one or more virtual machines (VMs) executing on the WAOST device 202. Additionally, in one or more embodiments of this technology, virtual machine(s) running on the WAOST device 202 may be managed or supervised by a hypervisor.

In the network environment 200 of FIG. 2, the WAOST device 202 is coupled to a plurality of server devices 204(1)-204(n) that hosts a plurality of databases 206(1)-206(n), and also to a plurality of client devices 208(1)-208(n) via communication network(s) 210. A communication interface of the WAOST device 202, such as the network interface 114 of the computer system 102 of FIG. 1, operatively couples and communicates between the WAOST device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the WAOST device 202, the server devices 204(1)-204(n), and/or the client devices 208(1)-208(n) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and WAOST devices that efficiently track the operational states of web applications and notify users of the operational states.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The WAOST device 202 may be a standalone device or integrated with one or more other devices or apparatuses, such as one or more of the server devices 204(1)-204(n), for example. In one particular example, the WAOST device 202 may include or be hosted by one of the server devices 204(1)-204(n), and other arrangements are also possible. Moreover, one or more of the devices of the WAOST device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the WAOST device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store React JavaScript libraries and historical data that relates to the web applications.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the WAOST device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the WAOST device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the WAOST device 202, the server devices 204(1)-204(n), or the client devices 208(1)-208(n), for example, may be configured to operate as virtual instances on the same physical machine. In other words, one or more of the WAOST device 202, the server devices 204(1)-204(n), or the client devices 208(1)-208(n) may operate on the same physical device rather than as separate devices-communicating through communication network(s) 210. Additionally, there may be more or fewer WAOST devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
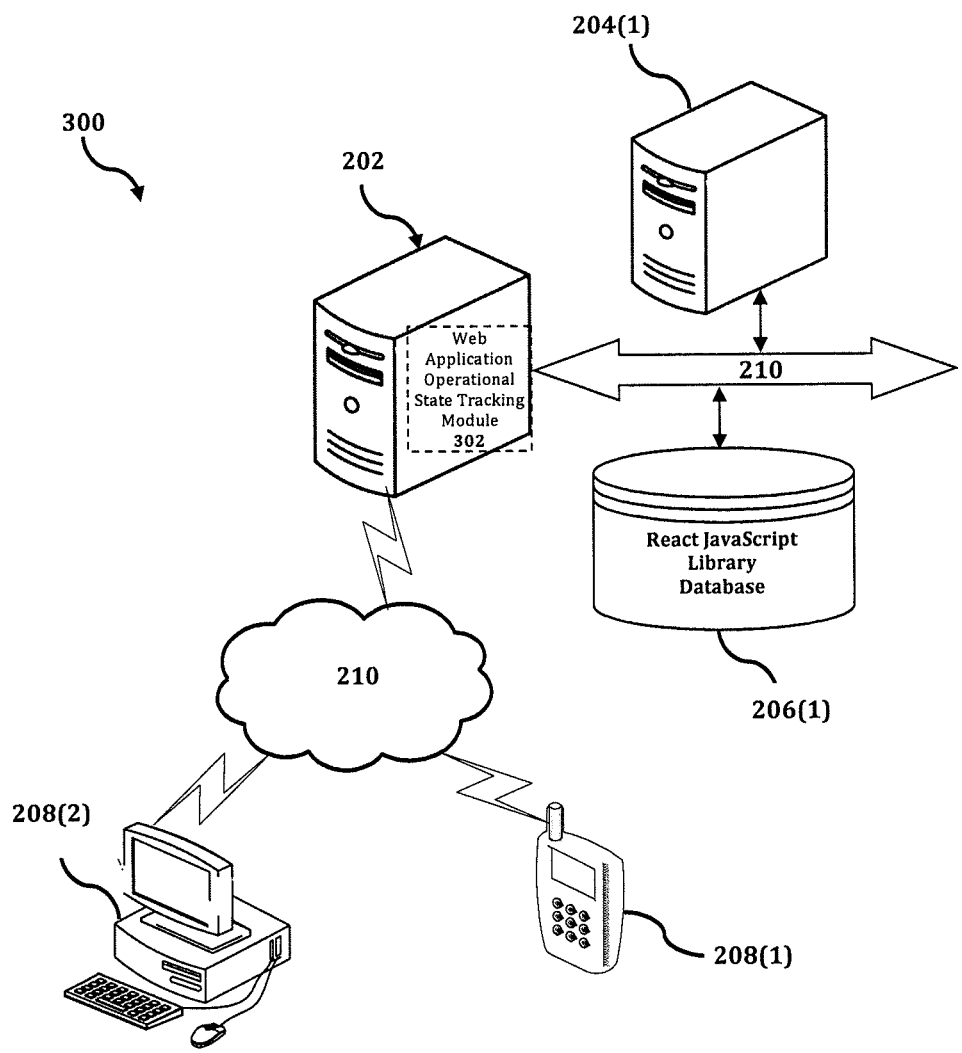
FIG. 3 shows an exemplary system for notifying a user of an operational state of a web application.

The WAOST device 202 is described and shown in FIG. 3 as including a web application operational state tracking module 302, although it may include other rules, policies, modules, databases, or applications, for example. As will be described below, the web application operational state tracking module 302 is configured to track an operational state of a web application and to notify a user of the operational state in an automated, efficient, scalable, and reliable manner. Based on values obtained from the web application, the web application operational state tracking module 302 determines an operational state, notifies a user of the operational state, and then monitors the web application in order to continuously update the determination of the operational state and to ensure that the user receives current information with respect to the operational state.

In an exemplary embodiment, the web application operational state tracking module 302 is implemented as software code that is compatible with any React JavaScript library and is reusable with any such library and with any web application that is compatible with a React JavaScript library. In this aspect, the web application operational state tracking module 302 may simplify a software development by providing the desired functionality without a need for customized software.

An exemplary process 300 for tracking an operational state of a web application and notifying a user thereof by utilizing the network environment of FIG. 2 is shown as being conducted in FIG. 3. Specifically, a first client device 208(1) and a second client device 208(2) are illustrated as being in communication with WAOST device 202. In this regard, the first client device 208(1) and the second client device 208(2) may be "clients" of the WAOST device 202 and are described herein as such. Nevertheless, it is to be known and understood that the first client device 208(1) and/or the second client device 208(2) need not necessarily be "clients" of the WAOST device 202, or any entity described in association therewith herein. Any additional or alternative relationship may exist between either or both of the first client device 208(1) and the second client device 208(2) and the WAOST device 202, or no relationship may exist.

Further, WAOST device 202 is illustrated as being able to access a React JavaScript library database 206(1). The web application operational state tracking module 302 may be configured to access this database for implementing a process for tracking an operational state of a web application.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the WAOST device 202 via broadband or cellular communication. Of course, these embodiments are merely exemplary and are not limiting or exhaustive.

Upon being started, the web application operational state tracking module 302 executes a process for tracking an operational state of a web application and notifying a user thereof. An exemplary process for tracking an operational state of a web application and notifying a user thereof is generally indicated at flowchart 400 in FIG. 4.

Figure 4:
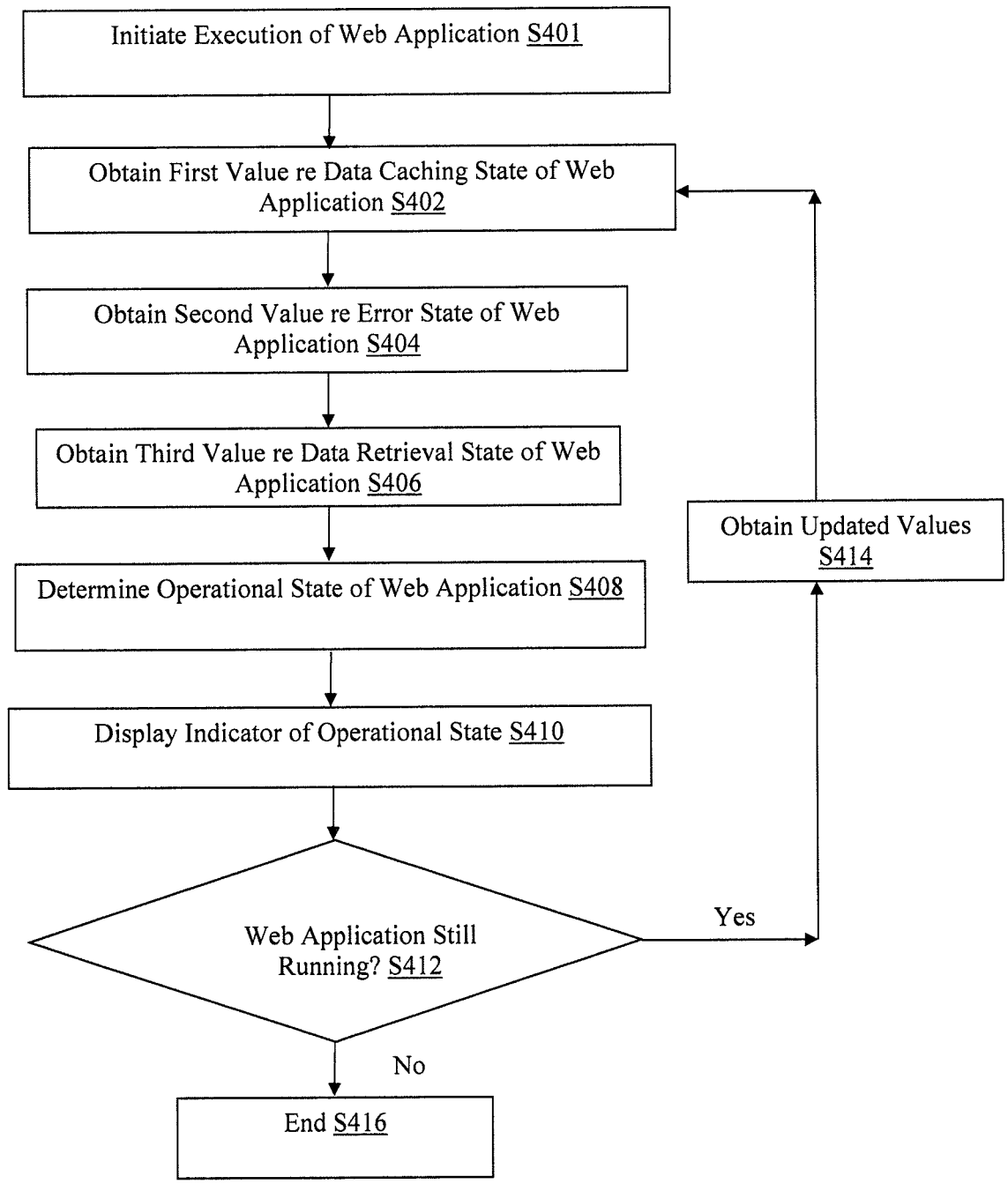
FIG. 4 is a flowchart of an exemplary process for notifying a user of an operational state of a web application.

In the process 400 of FIG. 4, an execution of a web application is initiated at step S401. In an exemplary embodiment, the web application may include any web application that is usable in a React JavaScript framework, such as, for example, a Gmail application, a Dropbox application, and/or a Facebook application. In an exemplary embodiment, the web application is a single page web application.

At step S402, a first value that relates to a data caching state is obtained from the web application. In an exemplary embodiment, the obtaining of the first value is performed by the web application operational state tracking module 302, which includes computer-readable instructions that are compatible with any React JavaScript library. For example, if the web application is a Gmail application, and if a user desires to send an email, the Gmail application may be in a data caching state when the user initiates a send command, thereby causing the Gmail application to load the data that is to be sent.

At step S404, a second value that relates to an error state is obtained from the web application. In an exemplary embodiment, the obtaining of the second value is performed by the web application operational state tracking module 302. For example, if an Internet connection is lost, or if a malicious act that disrupts the web application occurs, the web application may be in an error state.

At step S406, a third value that relates to a data retrieval state (also referred to herein as a "data loading state") is obtained from the web application. In an exemplary embodiment, the obtaining of the third value is performed by the web application operational state tracking module 302. For example, if the web application is a Gmail application, and if a user is accessing the content of an email message and/or an attachment to the email message, the Gmail application may be in a data retrieval or a data loading state.

At step S408, an operational state of the web application is determined. In an exemplary embodiment, the determination of the operational state is performed by the web application operational state tracking module 302 based on the obtained first value, the obtained second value, and the obtained third value.

At step S410, an indicator of the determined operational state is displayed on a screen of the user, such as, for example, a client device 208. For example, if the operational state is determined as being the data caching state, the corresponding content is shown on the screen of the client device 208. As another example, if the operational state is determined as being the data retrieval state or the data loading state, a rotating spinner icon or an hourglass icon may be displayed on the screen of the client device 208. As yet another example, if the operational state is determined as being the error state, a text string or a text message that indicates an occurrence of an error may be displayed on the screen of the client device 208, or an indicator that includes a symbolic icon such as a red flag may be displayed. In an exemplary embodiment, the web application operational state tracking module 302 may include instructions that prompt a user to provide input that relates to a content of the information to be displayed as one or more indicators of the determined operational state, thereby enabling the user to customize the indicators as desired.

At step S412, a determination as to whether the web application is still running is made. In an exemplary embodiment, the web application operational state tracking module 302 continually monitors the web application to determine whether the web application is still executing or whether the execution has completed. When the execution of the web application is completed (i.e., a determination of "No" from step S412), the process ends at step S416.

When a determination is made that the web application is still running (i.e., "Yes" from step S412), at step S414, updated values are obtained. In an exemplary embodiment, the web application operational state tracking module 302 loops back to step S402 in order to obtain an updated first value, and then proceeds to steps S404 and S406 to obtain updated second and third values. In this manner, the process 400 effectively tracks the operational state of the web application by continually updating the first, second, and third values throughout the entirety of the execution of the web application.

Figure 5:
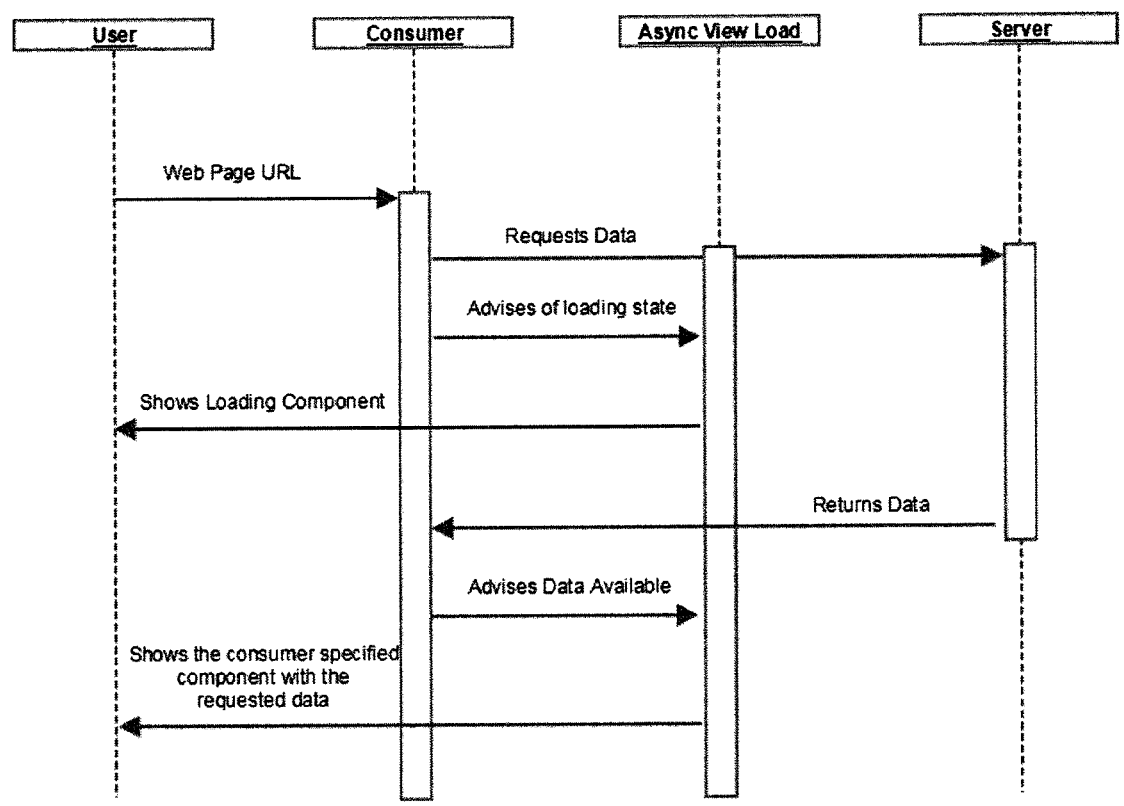
FIG. 5 is a data flow diagram of an exemplary scenario in which data is successfully requested and retrieved while a web application is running.

FIG. 5 is a data flow diagram of an exemplary scenario in which data is successfully requested and retrieved while a web application is running. As illustrated in FIG. 5, a user may initiate an execution of a web application by inputting a web page Uniform Resource Locator (URL) address. After the web application begins running, the web application may request data from a server, and may provide a first value to a web application operational state tracking module (indicated in FIG. 5 as "Async View Load") that relates to a data loading operational state. The web application operational state tracking module then communicates with the user, e.g., via a client device 208, so as to cause the client device 208 to display an indicator of the data loading state.

When the server has completed its function of loading data in response to the request, the server may then transmit the loaded data to the web application. The web application may then provide a third value to the web application operational state tracking module that indicates that the requested data has been received and is available for access by the user. The web application operational state tracking module then communicates with the user so as to cause the client device 208 to display content that relates to the requested data.

Figure 6:
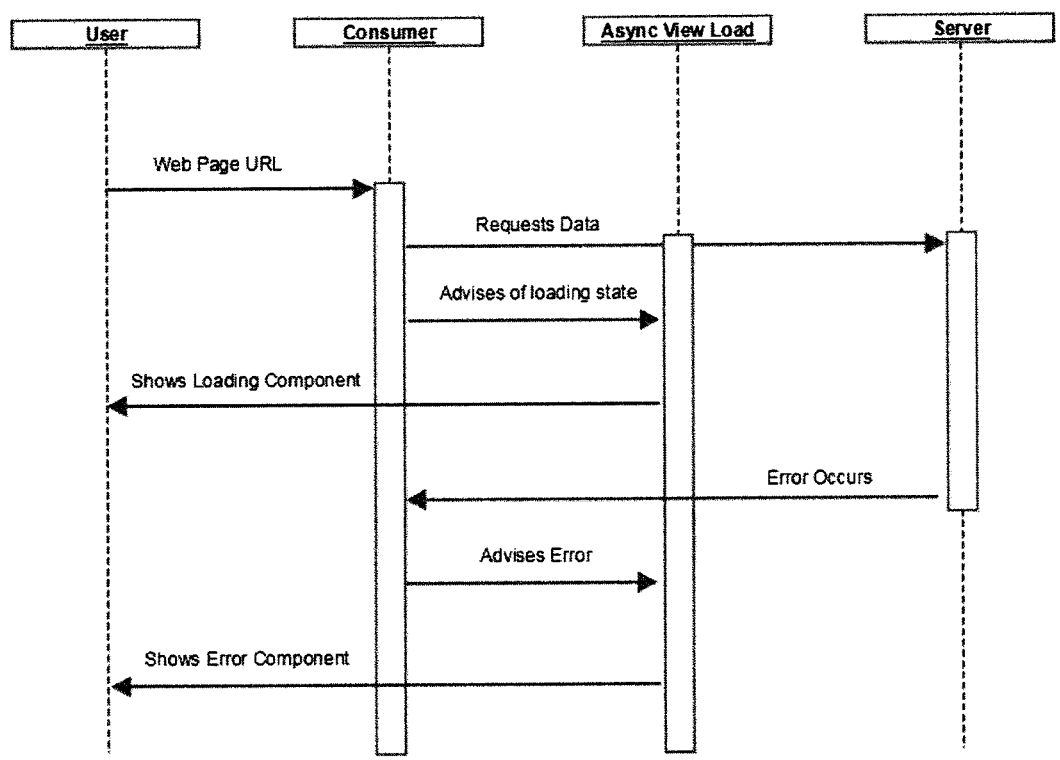
FIG. 6 is a data flow diagram of an exemplary scenario in which data is requested and an error occurs while a web application is running.

FIG. 6 is a data flow diagram of an exemplary scenario in which data is requested and an error occurs while a web application is running. As illustrated in FIG. 6, a user may initiate an execution of a web application by inputting a web page Uniform Resource Locator (URL) address. Similarly as illustrated in FIG. 5, after the web application begins running, the web application may request data from a server, and may provide a first value to a web application operational state tracking module (indicated in FIG. 6 as "Async View Load") that relates to a data loading operational state. The web application operational state tracking module then communicates with the user, e.g., via a client device 208, so as to cause the client device 208 to display an indicator of the data loading state.

When the server attempts to perform the function of loading data in response to the request, an error may occur. In this case, the server notifies the web application that an error has occurred. The web application may then provide a second value to the web application operational state tracking module that indicates that an error has occurred. The web application operational state tracking module then communicates with the user so as to cause the client device 208 to display an indicator of the error state.

Accordingly, with this technology, an optimized process for tracking an operational state of a web application and notifying a user thereof is provided. The optimized process enables a user to monitor the operational state of a web application quickly and efficiently and without a need to generate customized software therefor.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for notifying a user of an operational state of a web application, the method comprising:
   obtaining, from the web application, a first value that relates to a data caching state, a second value that relates to an error state, and a third value that relates to a data retrieval state;
   determining, based on the obtained first value, the obtained second value, and the obtained third value, that the operational state of the web application is the data caching state; and
   displaying, on a screen of a user device, information that relates to the determined operational state,
   wherein an execution of the web application is initiated by an input of a web page Uniform Resource Locator (URL) address received from the user,
   wherein the method is implemented in a React JavaScript framework by using a set of computer-readable instructions that is compatible with any React JavaScript application, and wherein the web application includes any web application that is usable in the React JavaScript framework, and
   wherein the displaying comprises displaying content that corresponds to the data being cached.

2. The method of claim 1, further comprising receiving, from the user, at least one instruction relating to a content of the information that relates to the determined operational state, and determining, based on the received at least one instruction, the content of the information to be displayed.

3. The method of claim 1, wherein when the operational state of the web application is determined as an error state, the displaying comprises displaying a text string that indicates an occurrence of an error.

4. The method of claim 1, wherein the web application includes at least one from among a Gmail application, a Dropbox application, and a Facebook application.

5. The method of claim 1, further comprising updating the operational state by continuously obtaining, from the web application, each of the first value, the second value, and the third value, and when at least one from among the first value, the second value, and the third value has changed, determining an updated operational state and displaying updated information that relates to the determined updated operational state.

6. A computing apparatus, comprising:
a display;
a processor; and
a communication interface coupled to each of the processor and the display,
wherein the processor is configured to implement a React JavaScript framework by using a set of computer-readable instructions that is compatible with any React JavaScript application in order to:
obtain, from a web application that is running on the computing apparatus, a first value that relates to a data caching state, a second value that relates to an error state, and a third value that relates to a data retrieval state;
determine, based on the obtained first value, the obtained second value, and the obtained third value, an operational state of the web application; and
cause the display to display information that relates to the determined operational state,
wherein an execution of the web application is initiated by an input of a web page Uniform Resource Locator (URL) address received from the user,
wherein the web application includes any web application that is usable in the React JavaScript framework, and
wherein when the operational state of the web application is determined as a data caching state, the processor is further configured to cause the display to display content that corresponds to the data being cached.

7. The computing apparatus of claim 6, wherein the processor is further configured to receive, from a user via the communication interface, at least one instruction relating to a content of the information that relates to the determined operational state, and to determine, based on the received at least one instruction, the content of the information to be displayed.

8. The computing apparatus of claim 6, wherein when the operational state of the web application is determined as an error state, the processor is further configured to cause the display to display a text string that indicates an occurrence of an error.

9. The computing apparatus of claim 6, wherein the web application includes at least one from among a Gmail application, a Dropbox application, and a Facebook application.

10. The computing apparatus of claim 6, wherein the processor is further configured to update the operational state by continuously obtaining, from the web application, each of the first value, the second value, and the third value, and when at least one from among the first value, the second value, and the third value has changed, to determine an updated operational state and to cause the display to display updated information that relates to the determined updated operational state.

11. A non-transitory computer-readable medium configured to store first instructions for implementing a method for notifying a user of an operational state of a web application, wherein when executed, the first instructions cause a computer to:
obtain, from the web application, a first value that relates to a data caching state, a second value that relates to an error state, and a third value that relates to a data retrieval state;
determine, based on the obtained first value, the obtained second value, and the obtained third value, the operational state of the web application; and
display, on a screen of a user device, information that relates to the determined operational state,
wherein an execution of the web application is initiated by an input of a web page Uniform Resource Locator (URL) address received from the user, wherein the method is implemented in a React JavaScript framework, and wherein the first instructions are compatible with any React JavaScript application, and wherein the web application includes any web application that is usable in the React JavaScript framework, and
wherein when the operational state of the web application is determined as a data caching state, the first instructions are further configured to cause the computer to display content that corresponds to the data being cached.

12. The computer-readable medium of claim 11, wherein the first instructions further cause the computer to receive, from the user, at least one second instruction relating to a content of the information that relates to the determined operational state, and to determine, based on the received at least one second instruction, the content of the information to be displayed.

13. The computer-readable medium of claim 11, wherein when the operational state of the web application is determined as an error state, the first instructions further cause the computer to display a text string that indicates an occurrence of an error.

14. The computer-readable medium of claim 11, wherein the web application includes at least one from among a Gmail application, a Dropbox application, and a Facebook application.

15. The computer-readable medium of claim 11, wherein the first instructions further cause the computer to update the operational state by continuously obtaining, from the web application, each of the first value, the second value, and the third value, and when at least one from among the first value, the second value, and the third value has changed, determining an updated operational state and displaying updated information that relates to the determined updated operational state.

* * * * *